United States Patent [19]

Kockler et al.

[11] 4,413,265

[45] Nov. 1, 1983

[54] INK JET PRINTER

[75] Inventors: Barry C. Kockler, Lewisville; Theodore S. Geiselman, Plano; Gerda N. Black, Garland, all of Tex.

[73] Assignee: The Mead Corporation, Dayton, Ohio

[21] Appl. No.: 355,799

[22] Filed: Mar. 8, 1982

[51] Int. Cl.³ .......... G01D 15/18

[52] U.S. Cl. .......... 346/1.1; 346/75

[58] Field of Search .......... 346/1.1, 75, 140

[56] References Cited

U.S. PATENT DOCUMENTS

| | | | |
|---|---|---|---|
| 3,701,998 | 10/1972 | Mathis | 346/75 |
| 4,031,561 | 6/1977 | Paranjpe | 346/1 |
| 4,081,804 | 3/1978 | Van Breemen | 346/75 |
| 4,085,409 | 4/1978 | Paranjpe | 346/75 |
| 4,160,982 | 7/1979 | Keur | 346/75 |
| 4,238,805 | 12/1980 | Paranjpe et al. | 346/75 |
| 4,305,079 | 12/1981 | Mix | 346/75 |

OTHER PUBLICATIONS

IBM Technical Disclosure Bulletin, vol. 20, No. 1, Jun. 1977, pp. 33–34, "Charge Electrode Alignment & Retraction," A. L. Mix, Jr.

IBM Technical Disclosure Bulletin, vol. 19, No. 8, Jan. 1977, pp. 3216–3217, "Ink Jet Head", K. A. Krause.

*Primary Examiner*—Donald A. Griffin
*Attorney, Agent, or Firm*—Biebel, French & Nauman

[57] ABSTRACT

An ink jet printer includes a catcher having a catcher plate along the lower portion thereof which is pivotally mounted for rotation about an axis parallel to a row of jet drop streams produced by the ink jet printer print head. A charge electrode plate, defining a plurality of notched charge electrodes, is movable between a drop charging position and a remote position. At start up and shut down of the printer, the charge electrode plate is maintained in its drop charging position when a deflection field is produced by a deflection electrode, so as to shield the drops from the deflection field. The catcher is pivoted into a full catch position at start up and shut down so as to catch substantially all of the drops produced by the relatively unstable jet drop streams.

11 Claims, 14 Drawing Figures

INK JET PRINTER

BACKGROUND OF THE INVENTION

The present invention relates to ink jet printing and, more particularly, to an ink jet printer in which printer operation and reliability at start up and shut down are enhanced.

Ink jet printers accomplish printing by depositing drops of ink on a print receiving medium in a pattern such that a print image is collectively formed by the drops. Typically, an ink jet printer includes a print head which defines a fluid reservoir in which electrically conductive ink is supplied. A plurality of orifices, arranged in one or more rows, are defined by an orifice plate mounted on the print head and each of the orifices communicates with the fluid reservoir. Ink is forced under pressure through the orifices and emerges as a plurality of fluid filaments. Varicosities are generated in the fluid filaments by mechanical stimulation of the orifice plate or by generating pressure waves which travel through the ink in the fluid reservoir. Fluid filaments are therefore caused to break up into streams of ink drops of substantially uniform size and spacing.

Charge electrodes are positioned beneath the orifice plate and adjacent the tips of the fluid filaments. Electrical charge potentials, selectively applied to the charge electrodes, induce corresponding charges of opposite polarity on the drops as they are formed from the filament tips. The drops then pass downwardly through a deflection field, with the charged drops being deflected by the field and the uncharged drops passing through the field in nondeflected trajectories. The amount of drop deflection is dependent upon a number of factors, including the level of charge carried by the drops. Some ink jet printers have operated in a binary fashion with the drops from each jet drop stream being either caught or deposited at a single print position. Such a printer is illustrated in Mathis U.S. Pat. No. 3,701,998. Other ink jet printers, such as for example that shown in Paranjpe U.S. Pat. No. 4,085,409, deflect the drops in each jet drop stream to a number of print positions.

At the start up of an ink jet printer, the fluid flow through the orifices and the formation of drops from the filaments are irregular and unpredictable. Exceptionally large drops of ink may be formed from the filaments and the trajectories of such drops are largely uncontrolled. As a consequence, there is a possibility that large amounts of ink may be deposited upon the charge electrodes and upon the deflection field electrode structure of the printer. If this occurs, the electrically conductive ink tends to short out the charge electrodes and the deflection electrode structure, and may also interfere with the trajectories of the jets once stable operation is obtained. Additionally, ink may be deposited on the print receiving medium transport and spoil the subsequently printed copies carried by the transport.

The large drops of ink which occur at start up cannot be predictably caught by a catcher in its normal operational position. Even with a catcher arrangement in which the catcher is positioned in line with the nondeflected trajectories of the jet drop streams and deflection of the drops is required for printing, the normal operating position of the catcher is one in which only a relatively small deflection of the drops is needed for the drops to clear the catcher and strike the print receiving medium.

Similar problems are encountered at shut down of the printer. As the pressure of the ink is reduced and fluid flow through the orifices is terminated, the jets once again become unstable and difficult to control.

Several approaches have been taken to overcome the problems presented by jet instability at start up and shut down. As shown in Van Breemen et al U.S. Pat. No. 4,081,804, a print head has been mounted over a drip pan at start up to collect drops formed from the fluid filaments until after the jets become stable. A print receiving medium is then transported beneath the print head and above the drip pan, and printing is initiated. The Van Breemen et al patent also discloses pivotal mounting arrangements for a pair of catchers in which the catchers can be pivoted downward and outward from the print head to permit inspection of the charge electrode structure.

A notched charge electrode plate is shown in IBM Technical Disclosure Bulletin, Vol. 20, No. 1, June 1977, pp. 33 and 34, which may be pivoted into an operating position after start up to reduce wetting of the charge electrodes. In an alternative arrangement, the charge electrode plate may be translated into its operating position. Pivoting of the charge electrode plate requires a substantial clearance in the printer structure. The translational mechanism dislosed is one in which the charge electrode plate is mounted on a spring arm and cammed out of its operating position. It will be appreciated that a spring mounting mechanism may be subject to undesirable vibration and, additionally, positioning of the charge electrode plate may be subject to dimensional inaccuracies.

IBM Technical Disclosure Bulletin, Vol. 19, No. 8, January 1977, pp. 3216 and 3217, discloses an ink jet printer in whih a pair of charge electrode plates are moved laterally into and out of operating positions after start up and prior to shut down, respectively. Additionally, a pair of catchers, positioned outwardly of the two parallel rows of jet drop streams during operation of the printer, are moved laterally together into contact at start up and shut down to prevent splattering of the ink on the print receiving medium. All of the drops are charged and deflected before the catchers are moved apart at start up and before the catchers are moved together at shut down. Since the catchers in the print head are moved together beneath the pair of rows of jet drop streams so that the streams strike the upper surfaces of the catchers, it is necessary that these upper surfaces be formed of a porous material to ingest the substantial flow of ink which they receive.

Keur U.S. Pat. No. 4,160,982 discloses an ink jet printing system having an accumulator or catcher which is positioned in line with the nondeflected jet drop stream during printing. Drops which are to be deposited on the print receiving medium are deflected away from the catcher. At start up of the printing system, the charging and deflecting electrodes are pivoted out of their normal operating positions and the catcher is raised such that it directly abuts the print head. After a stable jet drop stream is produced, the catcher is lowered and the charging and deflecting electrodes are pivoted into their normal operating positions. The pivoting mechanism for the charge and deflection electrodes requires a substantial clearance in the printing system. Additionally, the rack and pinion mechanism by which the catcher is raised is relatively bulky and accurate positioning of the catcher may be difficult.

An improved jet ink printing system is disclosed in Paranjpe et al U.S. Pat. No. 4,238,805. In the Paranjpe et al system, a print head is provided which generates two parallel rows of jet drop streams. A pair of charge electrode plates are movably mounted such that they may be translated into and out of drop charging positions. Each of a pair of catchers defines a drop catching surface and a drop ingesting slot along the lower edge of the drop catching surface. Each catcher is pivotally mounted for rotation about an axis parallel to the rows of jet drop streams. The catchers may be pivoted from drop catching positions, in which their drop catching surfaces are substantially parallel, to full catch positions in which their drop catching surfaces are inclined to face upward and intercept nondeflected jet drop streams. In the full catch position, the drop ingesting slots are positioned closely together.

A mechanical linkage system is provided in the device disclosed in the Paranjpe et al patent for pivoting the catchers from their full catch positions to their drop catch positions after start up of the printer. The linkage arrangement also moves the charge electrode plates into the drop charging positions. This occurs after the catchers are pivoted sufficiently to apply a drop deflecting potential thereto, but prior to rotation into their drop catching positions. While providing a substantial improvement in start up and shut down of an ink jet printer, the mechanical linkage arrangement for translating the charge electrode plates and rotating the catchers is relatively complicated. Additionally, since both the charge electrode plates and the catchers are actuated by a single linkage arrangement, the sequence and timing of movement of these printer elements may not be easily adjusted individually.

Accordingly, it is seen that there is a need for a simple, reliable, and compact ink jet printer in which start up and shut down of the printer are facilitated.

SUMMARY OF THE INVENTION

An ink jet printer for depositing ink drops on a print receiving medium carried by a print receiving medium transport includes a print head means for generating a row of fluid filaments. The fluid filaments break up into a row of jet drop streams which are directed at the medium transport. A plurality of charge electrodes are mounted on a charge electrode plate. The plate is movable between a drop charging position, in which the charge electrodes are adjacent to and partially surround associated ones of the jet drop streams at the points of drop break up, and a remote position. A means is provided for selectively applying charging potentials to the charge electrodes. A deflection electrode means produces an electrical deflection field in the paths of the jet drop streams so as to deflect charged drops.

A catcher means defines a catcher plate along the lower edge thereof. The catcher means is pivotally mounted for rotation about an axis parallel to the row of jet drop streams for movement between an operating position and a full catch position. When the catcher means is in the operating position, the catcher plate is positioned to catch sufficiently deflected jet drops while permitting drops deflected by the field to a lesser degree, or not at all, to strike the print receiving medium. When the catcher means is in the full catch position, the catcher plate is positioned in the path of undeflected jet drops and extends for a substantial distance on both sides of the row of jet drop streams.

A means for rotating the catcher into its operating position and its full catch position is provided. A means is also provided for moving the charge plate from its remote position into its drop charging position prior to production of the electrical deflection field at start up of the printer, whereby the charge electrodes shield the jet drop streams and thus prevent charging of the drops by the deflection field.

The means for rotating the catcher means comprises a shaft attached to the catcher means and pivotally supported by a catcher mounting means. The shaft defines a crank end portion. A catcher linkage means engages the crank end portion. A catcher spring biasing means urges the catcher means toward its full catch position. A catcher electrical actuator means is connected to the catcher linkage means for rotating the catcher means into its operating position against the opposing force of the catcher spring biasing means.

The means for moving the charge plate includes means for supporting the charge plate for sliding movement between its drop charging position and its remote position. A charge plate spring biasing means urges the charge plate toward the remote position. A charge plate linkage means contacts the charge plate and is connected to a charge plate actuator means which moves the charge plate into its drop charging position against the opposing spring force of the charge plate spring biasing means.

The charge plate electrical actuator means and the catcher electrical actuator means may each comprise a solenoid actuator.

The charge plate linkage means may include cam means connected to the charge plate electrical actuator means for movement therewith. A cam follower plate means is connected to a pivotally mounted actuation shaft and contacts the cam means. Charge plate actuator arms are secured to the actuation shaft for rotation therewith. The charge plate actuator arms contact the charge plate and move the charge plate into its drop charging position against the opposing force of the charge plate spring biasing means. The actuator arms may comprise leaf springs.

At start up the printer operates according to the steps of:

(a) initiating operation of the print head to produce a plurality of jet drop streams while maintaining the charge plate in its remote position and maintaining the catcher in a full catch position, (b) translating the charge plate toward the row of jet drop streams into a position such that the charge electrodes partially surround associated fluid filaments at the points of break up to provide shielding thereof, (c) applying an electrical deflection potential to a deflection electrode so as to produce a deflection field while using the charge electrodes to shield the jet drop streams from the deflection field, (d) pivoting the catcher into its operating position in which deflected drops strike the catcher while charging the drops sufficiently to deflect the drops to the catcher, and (e) initiating selective charging of the drops in the jet drop streams by selective application of charge potentials to the charge electrodes, whereby selected drops are deflected to strike a print receiving medium carried by the print receiving medium transport.

At shut down, the printer operates according to the steps of:

(a) terminating selective charging of drops in the jet drop streams and charging all of the drops, while maintaining the catcher in its operating position and maintaining the charge plate in its drop charging position such that the charge electrodes partially surround the fluid filaments at the points of drop break up, (b) pivoting the catcher into a full catch position between the print head and the print receiving medium transport such that the catcher extends a substantial distance to either side of the row of jet drop streams so as to catch the drops in the jet drop streams, (c) terminating the application of the electrical deflection potential to the deflection electrode so as to eliminate the deflection field while terminating charging of the drops in the jet drop streams, (d) translating the charge plate away from the row of jet drop streams to its remote position, and (e) terminating operation of the print head and production of the plurality of jet drop streams.

Accordingly, it is an object of the present invention to provide an ink jet printer and method of printer operation in which a catcher may be pivoted into a full catch position at start up, with the charge electrodes being retracted from the vicinity of the jet drop streams so as to prevent contamination of the charge electrodes by unstable streams; to provide such a printer and method in which a deflection electrode does not receive an operating deflection potential until after the charge plate is moved into its operating position, thereby shielding the jet drop streams from charging effects of the deflection field; to provide such a printer and method in which separate electrical actuators are provided for rotating the catcher and translating the charge plate; to provide such a printer and method in which reliability of start up and shut down are enhanced; to provide such a printer and method in which the catcher and charge plate are moved into their operating positions against opposing spring forces, whereby a power failure results in movement of the catcher into its full catch position and movement of the charge plate into its remote position; and to provide such a printer and method in which the sequence and timing of actuation of movement of the catcher and the charge plate may be adjusted.

Other objects and advantages of the invention will be apparent from the following description, the accompanying drawings and the appended claims.

DETAILED DESCRIPTION OF THE PREFERRED EMBODIMENT

Figure 1:
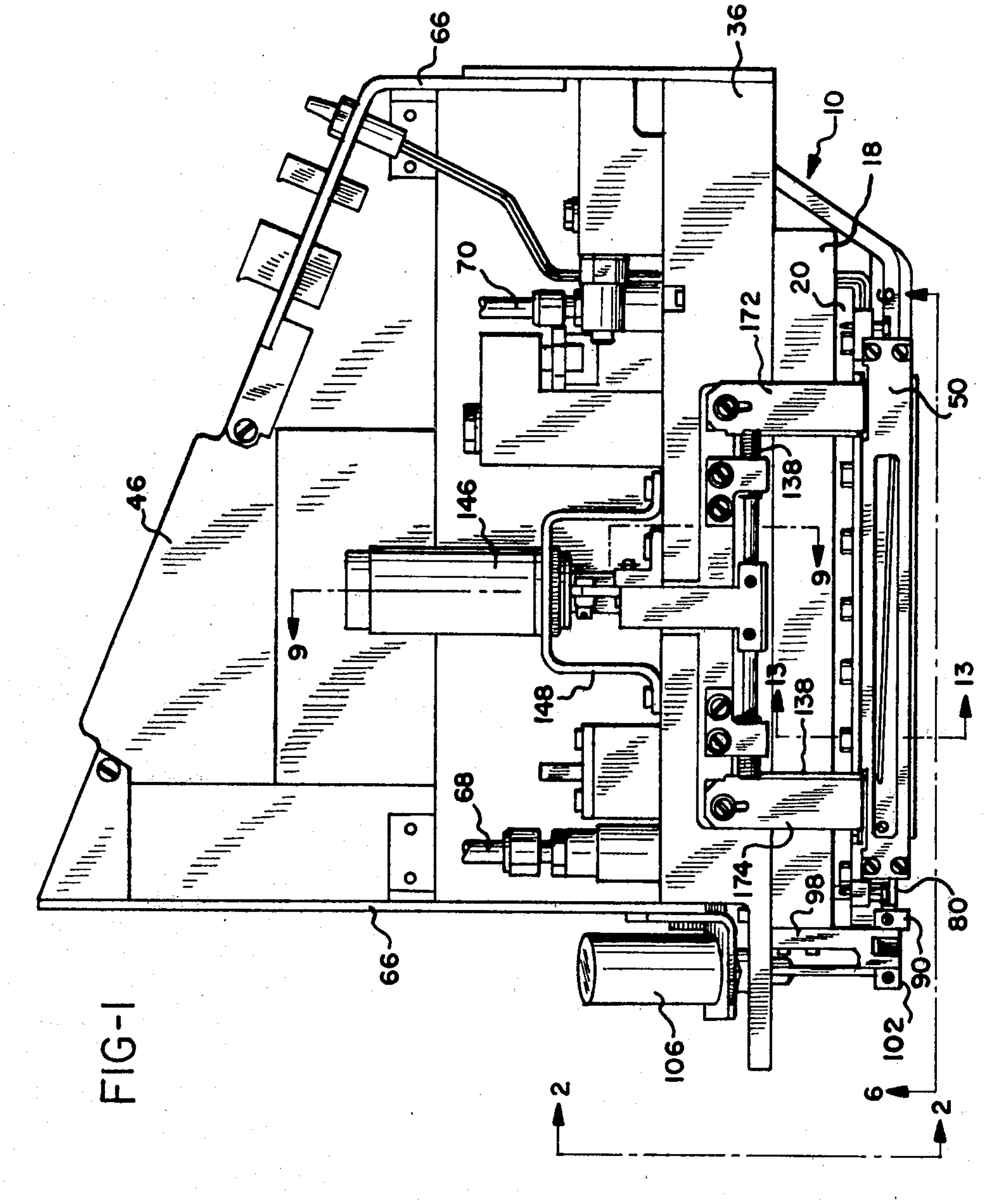
FIG. 1 is a front elevational view of the ink jet printer of the present invention.
Figure 13:
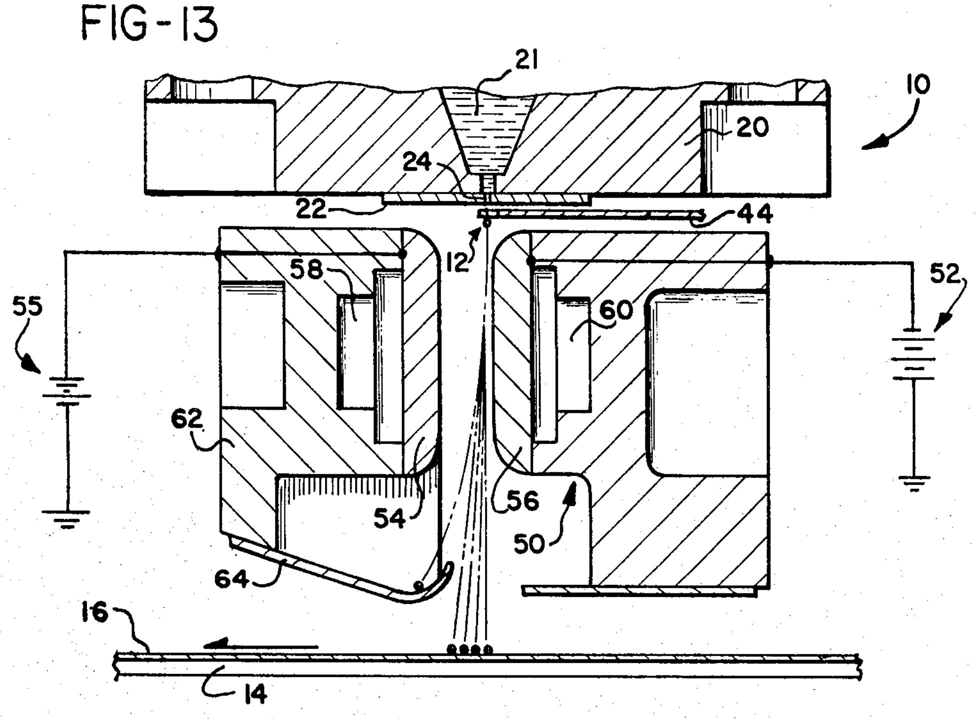
FIGS. 13 and 14 are enlarged partial sectional views, taken generally along line 13—13 in FIG. 1, illustrating rotation of the catcher means and translation of the charge plate with respect to the print head.

Reference is now made to FIGS. 1 and 13, illustrating the print head means 10 which forms a portion of the ink jet printer of the present invention. A row of fluid filaments which break up into a row of jet drop streams 12 are produced by the print head means 10. The streams 12 are directed toward a transport, such as conveyor belts 14, which carries a sheet of paper 16, or other print receiving medium, past the printer in an angular direction as taught in Paranjpe U.S. Pat. No. 4,085,409. The print head 10 includes an upper manifold portion 18 and a lower manifold portion 20 which together define an elongated fluid cavity or reservoir 21. The print head 10 further includes an orifice plate 22 which defines a plurality of orifices 24 arranged in a row normal to the plane of FIG. 13. Orifice plate 22 is mounted on the bottom of manifold portion 20 by an adhesive or, alternatively, by soldering or other appropriate means. The orifices 24 communicate with fluid cavity 21. Ink supplied to reservoir 21 under pressure emerges from the print head means 10 through orifices 24 as fluid filaments.

Electrically conductive ink is supplied to the reservoir 21 via a fluid supply inlet (not shown). Ink may be removed from reservoir 21 via fluid supply outlet (not shown). Inlet and outlet extend downward through manifold portion 18 and an upper print head member 36.

A stimulator arrangement (not shown) is provided for causing the fluid filaments to break up into streams of uniformly sized and spaced drops. Any one of a number of known prior art stimulator arrangements may be used for this purpose. Cha et al U.S. Pat. No. 4,138,687 and Cha U.S. Pat. No. 4,095,232 disclose stimulators of the type which produce plane waves in the ink in the reservoir 21, which waves produce pressure varicosities in the fluid filaments. As a consquence, uniform break up of the jet drop streams occurs. In the arrangement shown in Cha et al '687, a piston in contact with the ink is driven by a plurality of electrically excited piezoelectric transducers, while in the Cha '232 arrangement, piezoelectric transducers cause vibration of a flexible plate which forms one wall of the reservoir 21. Mathis U.S. Pat. No. 3,701,998 discloses a stimulator of the type which produces bending waves in the orifice plate 22 which travel along the plate and are coupled to the fluid filaments emerging from the orifices 24.

Figure 8:
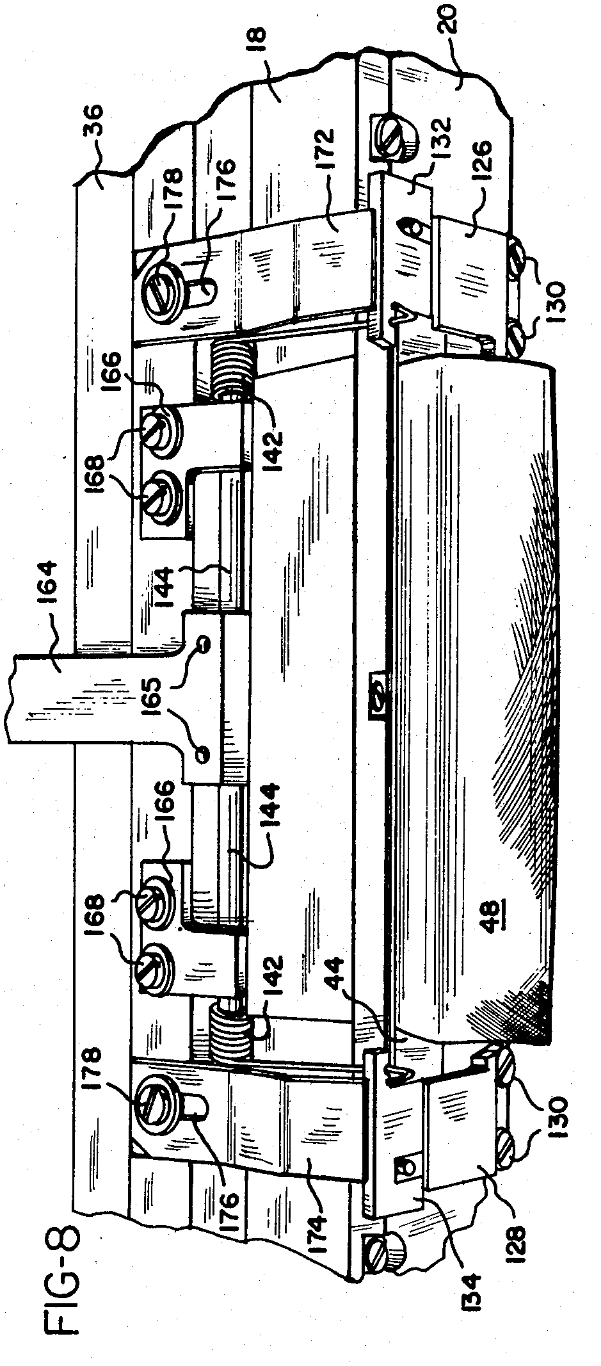
FIG. 8 is a partial perspective view of the printer with the catcher and deflection electrode removed, as seen from the front and slightly below, illustrating the mounting arrangement for the charge electrode plate.
Figure 7:
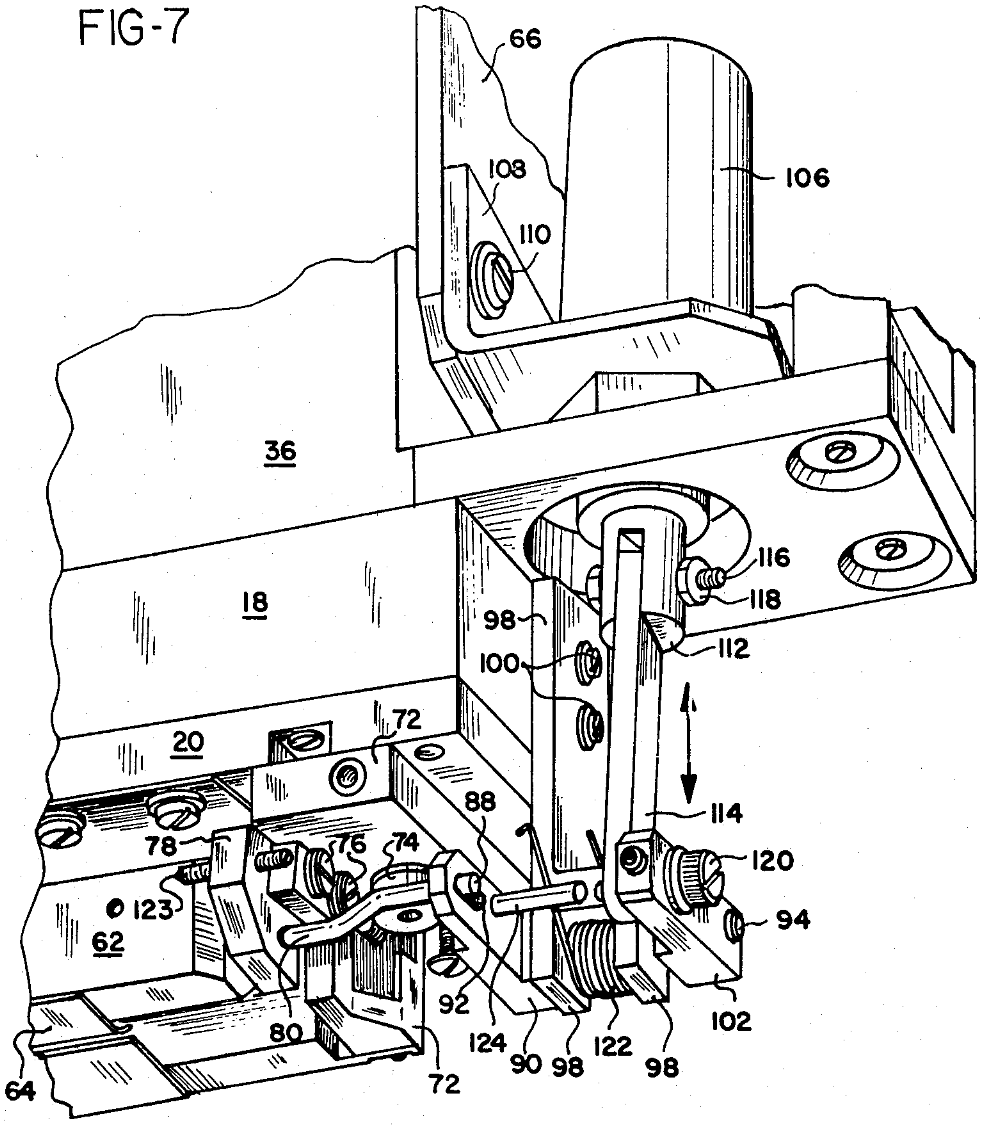
FIG. 7 is an enlarged perspective view illustrating the linkage arrangement for rotation of the catcher.
Figure 9:
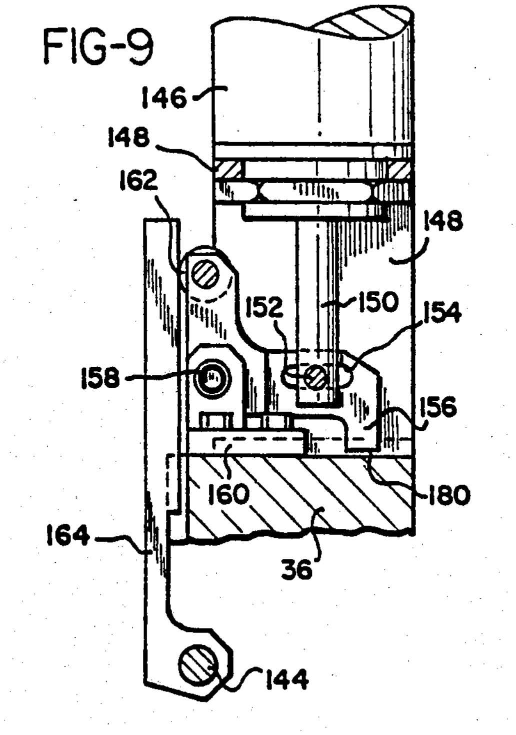
FIGS. 9 and 10 are enlarged partial sectional views, taken generally along line 9—9, illustrating a portion of the means for translating the charge electrode plate.

A charge electrode plate 44 has mounted thereon a plurality of charge electrodes. The charge plate is movable between a drop charging position shown in FIGS. 12 and 13 in which the charge electrodes are adjacent to and partially surround associated ones of the jet drop streams at the points of drop break up, and a remote position shown in FIGS. 11 and 14. Preferably, the charge electrode plate includes a nonconductive plate which defines a plurality of notches 45 along an edge of plate 44 which are lined with electrically conductive material, comprising the charge electrodes. A plurality of electrical conductors are printed on the charge electrode plate 44 and are electrically connected to connectors 46 via a Kapton (Trademark) polyimide film cable 48 which, for purposes of clarity, is deleted from all of the Figures with the exception of FIG. 8. The cable 48 is a generally flat multiple conductor cable available from E. I. DuPont deNemours & Co., Inc., Wilmington, Del. The cable 48 normally extends upward along one side of the printer for connection to connectors 46; it has, however, been disconnected from connectors 46 and lowered in FIG. 8 so as to reveal the printer structure that would otherwise be obscured.

Charge signals from a document scanning system or other source, such as an appropriately programmed computer, are applied to the charge electrodes via conductors connected to connectors 46. The charging signals may have a zero level or any of a plurality of predetermined non-zero (preferably negative polarity) levels for opposite polarity charging of drops.

A deflection electrode means, including electrode 50, is connected to a source 52 which provides a relatively high electrical deflection voltage, which preferably may be on the order of −1000 volts. An opposing electrode plate 54, which forms a part of the catcher means, is maintained at approximately +800 volts by source 55 and cooperates with the plate 56, upon which the −1000 volt deflection potential is impressed, to produce an electrical deflection field therebetween. Plates 54 and 56 are preferably formed of a porous metal material such that any drops striking these plates are ingested into partially evacuated cavities 58 and 60. Cavities 58 and 60 are connected to a vacuum pump and are maintained at a subatmospheric pressure.

Figure 14:
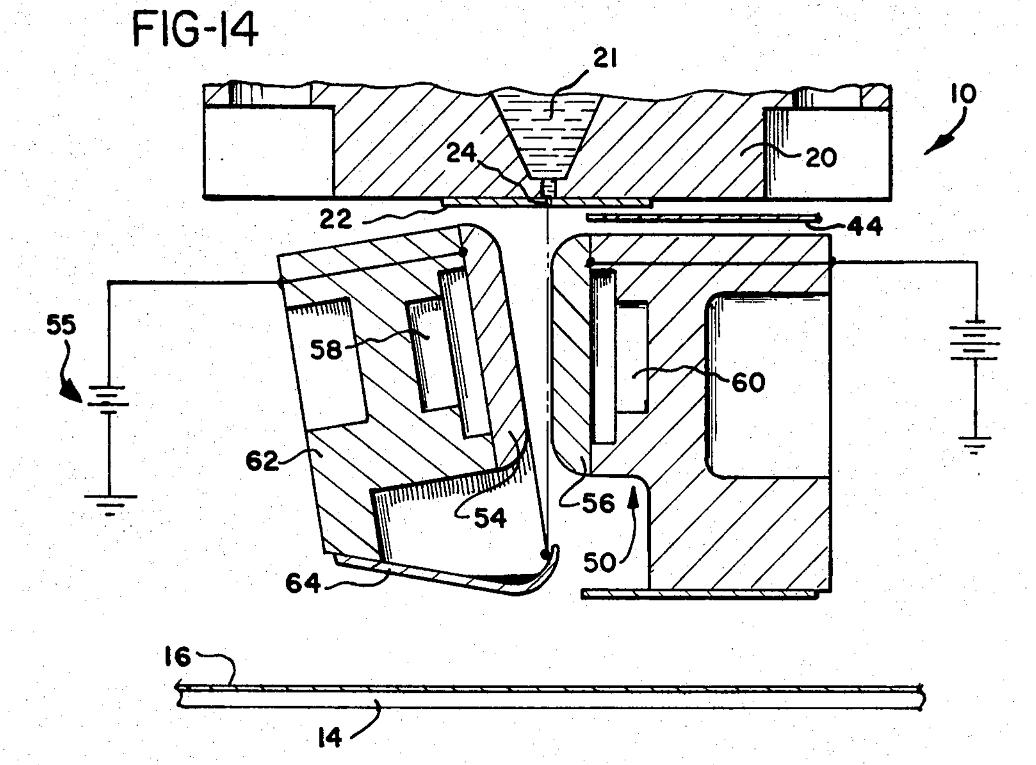

The printer includes a catcher means 62 comprising a catcher plate 64 along the lower portion thereof. The catcher means 62 is pivotally mounted for rotation about an axis, parallel to the row of jet drop streams, between an operating position and a full catch position. In the operating position, shown in FIG. 13, the catcher plate 64 is positioned in the path of undeflected jet drops for catching such undeflected jet drops to receive jet drops which are deflected by the greatest amount, while permitting jet drops deflected by lesser amounts by the field between the plates 54 and 56 to strike the print receiving medium 16. Additionally, drops carrying no charge pass through the field unaffected and are deposited on the print receiving medium. In the full catch position, the catcher plate 64 is positioned in the path of the undeflected jet drops and extends for a substantial distance on both sides of the row of jet drop streams. FIG. 14 depicts the catcher means rotated into its full catch position.

The ink jet printer of the present invention is housed within cabinet 66. Ink inlet 34 communicates with supply line 68, and outlet 42 communicates with outlet line 70. Solenoid actuated valve arrangements may be housed in member 36 or, alternatively, may be connected to lines 68 and 70 at a remote location. An ink supply system, including a pump and appropriate controls, is connected to lines 68 and 70 to provide ink under pressure as required by the print head.

Figure 4:
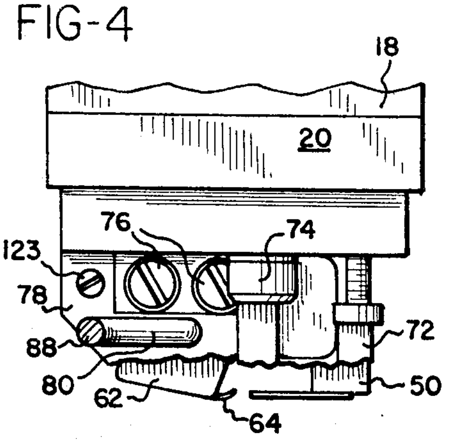
FIGS. 4 and 5 are partial sectional views, taken generally along line 4—4 in FIG. 3, illustrating rotation of the catcher.
Figure 5:
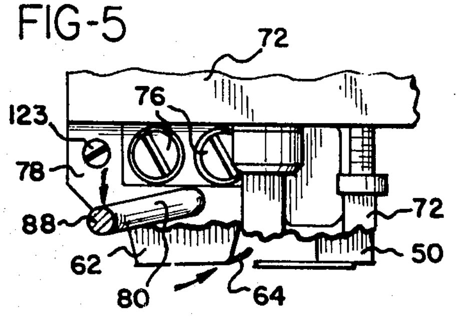
Figure 6:
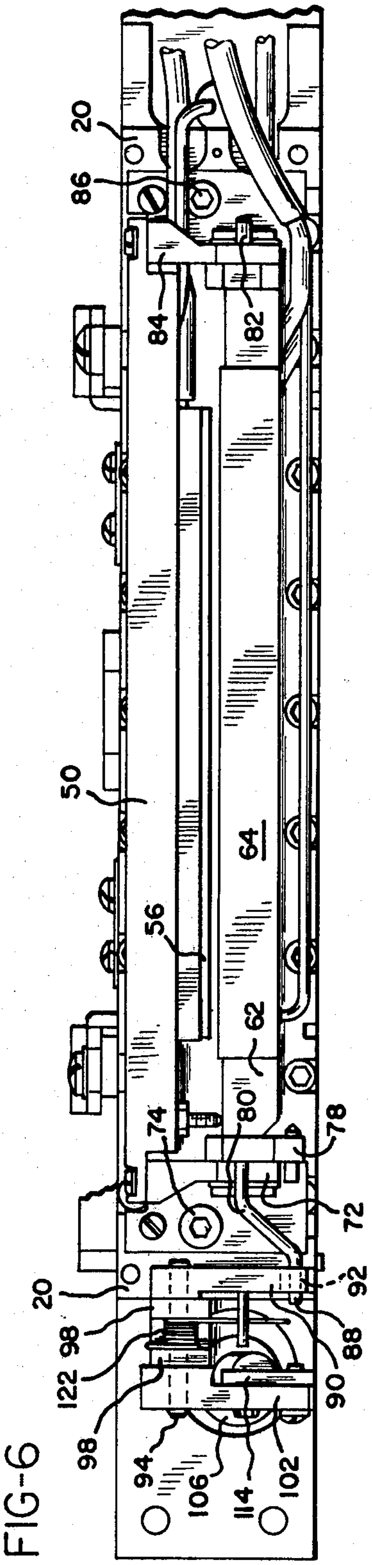
FIG. 6 is a bottom elevational view, taken generally along line 6—6 in FIG. 1.

A means for rotating the catcher into its operating position and into its full catch position is shown in greater detail in FIGS. 2–7. A support bracket 72 is secured to the bottom of manifold portion 20 by bolt 74. Attached to bracket 72 by bolts 76 is a bearing member 78. Bearing member 78 includes a sleeve bearing through which a shaft 80, attached to the catcher 62, extends. As seen in FIG. 6, a shaft 82 is connected to catcher 62 at the opposite end of the printer. Shaft 82 extends through a sleeve bearing in bracket 84 which is secured to the underside of manifold portion 20 by bolt 86. Shaft 80 defines a crank end portion 88 which is offset with respect to the axis of rotation of the catcher 62.

A catcher linkage means, including arm 90, engages the crank end portion 88 of shaft 80. Arm 90 defines a slot 92 through which portion 88 extends and is secured to shaft 94 by bolt 96. Shaft 94 is supported for free rotation by support member 98, attached to manifold portion 18 by bolts 100. Attached to the opposite end of shaft 94 is a lever arm 102 which is secured thereto by means of bolt 104. A catcher electrical actuator means, including electrical solenoid actuator 106, is mounted on bracket 108, which bracket is secured to cabinet 66 by means of bolts 110. Solenoid 106 includes a plunger shaft 112 which is pivotally attached to linkage arm 114 by means of bolt 116 and nut 118. The opposite end of arm 114 is pivotally attached to arm 102 by bolt 120. A spring 122 encircles shaft 94 and engages pin 124 attached to arm 90. As a consequence, spring 122 acts as a catcher spring biasing means which tends to urge arm 90 downward and, via shaft 80, urges the catcher 62 toward its full catch position and into contact with adjustable stop 123. Stop 123 is a threaded shaft extending through bearing member 78 and having a tapered end which contacts the back of catcher 62 when the catcher has moved into its full catch position. Should the printer lose electrical power, spring 122 causes the catcher 62 to move into a full catch position in which the drops from the jet drop streams are caught so as to preclude ink from striking the print receiving medium transport.

Figure 2:
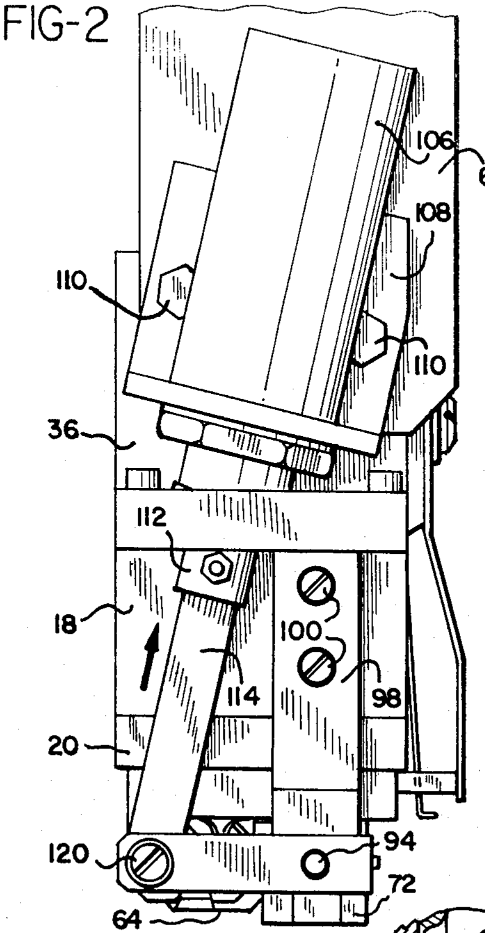
FIG. 2 is an enlarged partial side view, taken generally along line 2—2 in FIG. 1.

When it is desired to rotate the catcher 62 from its full catch position into its operating position, the solenoid actuator 106 is energized. The plunger 112 is raised and arm 102 is pivoted upward by means of link 114. Arm 102 therefore causes shaft 94 to rotate clockwise, as seen in FIG. 2 and, as a consequence, arm 90 is also raised. As arm 90 pivots upward, the crank end portion 88 of shaft 80 is raised, causing shaft 80 to rotate in a clockwise direction, as seen in FIGS. 4 and 5. As a result, catcher 82 is pivoted from the full catch position shown in FIG. 5 to the operating position illustrated in FIG. 4. Further rotation of the catcher is prevented by stop 125 (FIG. 6). Deactuation of solenoid 106 permits the spring 122 to force arm 90 downward, returning catcher 62 into its full catch position.

Figure 3:
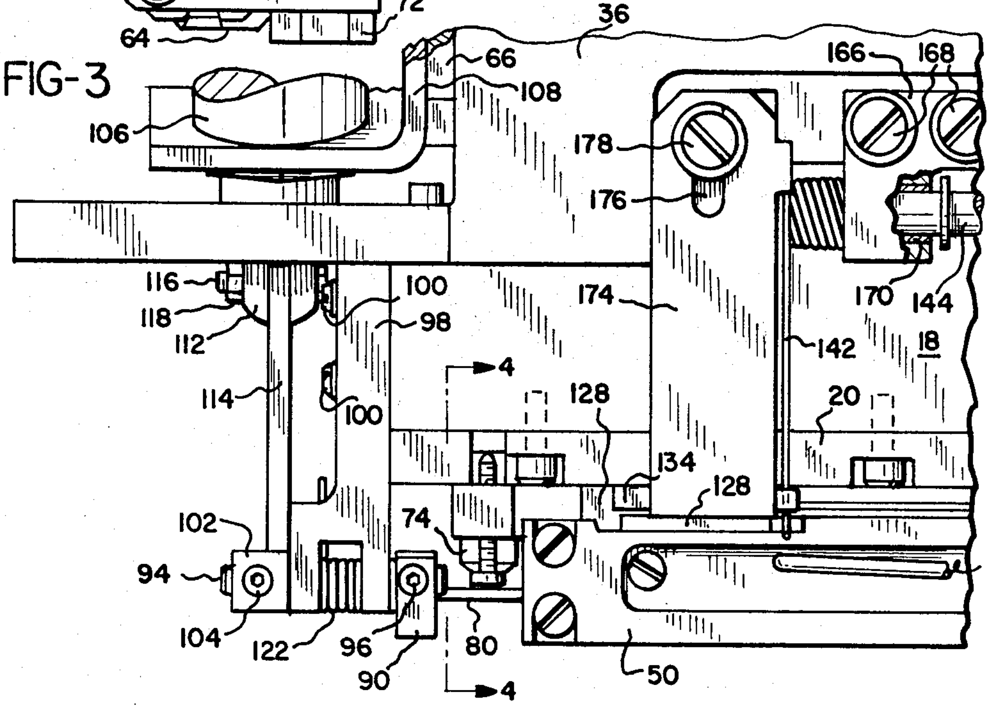
FIG. 3 is an enlarged partial front elevational view of the printer, similar to FIG. 1, illustrating the means for rotating the catcher.
Figure 10:
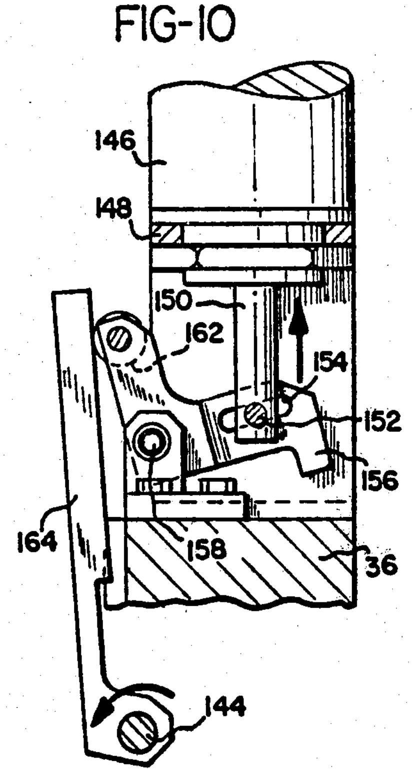
Figure 11:
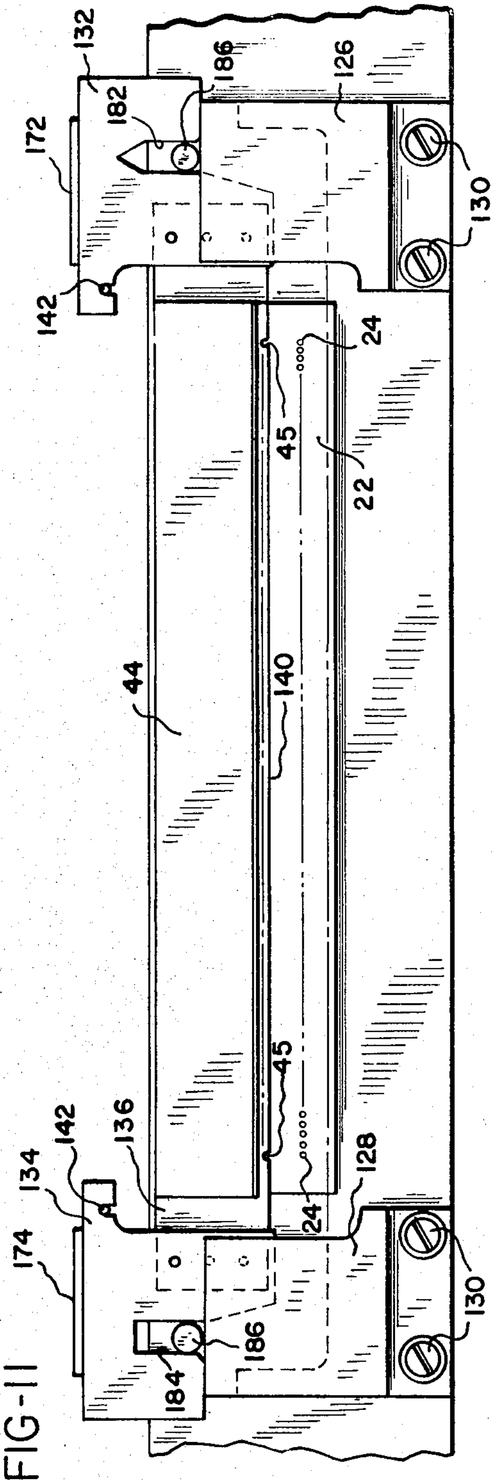
FIGS. 11 and 12 are enlarged bottom elevational views of the printer with the deflection electrode and catcher removed, illustrating movement of the charge electrode plate.
Figure 12:
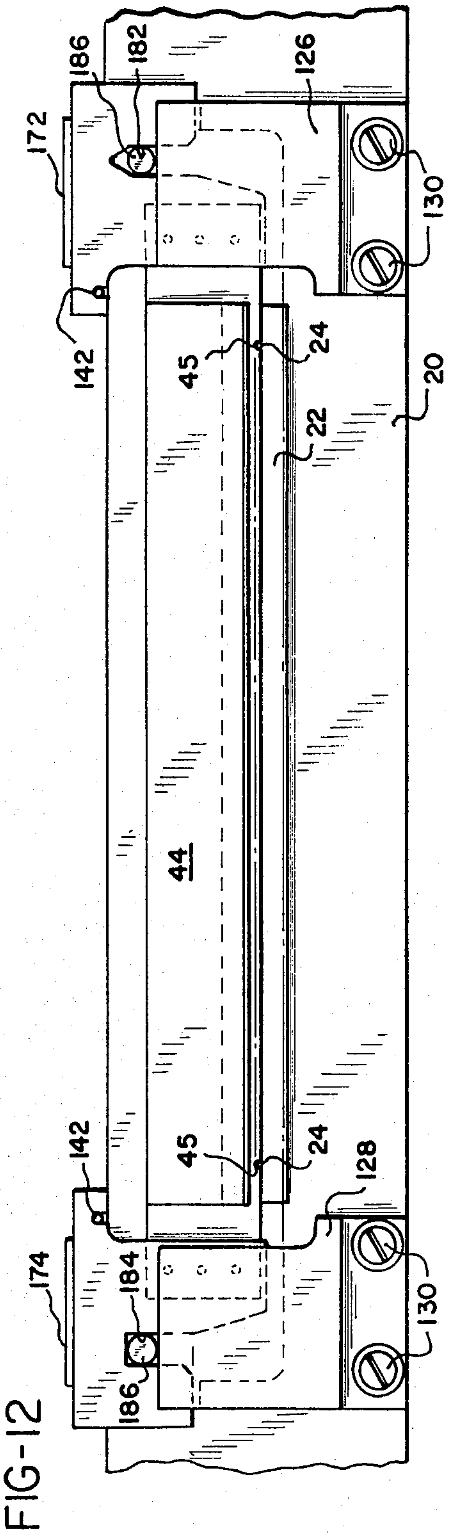

Reference is now made to FIGS. 8–12, and also to FIG. 3, which illustrate a means for moving the charge plate 44 between its remote position (shown in FIGS. 11 and 14) and its drop charging position (shown in FIGS. 12 and 13). It should be noted that the polyimide cables 48 have been deleted from FIGS. 11 and 12 for purposes of clarity.

Support members 126 and 128 are attached to the bottom of manifold portion 20 by means of bolts 130. The support members 126 and 128 provide a means for supporting the charge plate for sliding movement. The charge plate 44 includes a pair of charge plate adaptors 132 and 134. The adaptors are attached to a nonconductive plate portion 136 upon which printed circuit conductors are printed. The conductors provide electrical connections to the U-shaped or notched charge electrodes 45 along edge 140. The portion 136 is preferably adhesively attached to adaptors 132 and 134, and the adaptors are supported by and slide on the upper surfaces of the supports 126 and 128.

The means for moving the charge plate means also includes springs 142 which extend around shaft 144 and which engage adaptor plates 132 and 134 so as to urge the charge plate 44 toward its remote position. A charge plate electrical actuator means including solenoid 146 is mounted on member 36 by support bracket 148. The actuator plunger 150 (FIGS. 9 and 10) has a pin 152 extending therethrough which extends into a slot 154 defined by member 156. Member 156 is pivotally supported at pivot 158 by bracket 160. Also mounted on member 156 is a cam roller 162 which contacts a camming surface on lever arm 164. Arm 164 is secured to shaft 144 by screws 165 such that when the solenoid actuator 146 is energized and the plunger 150 raised, the shaft 144 pivots in a counterclockwise direction as seen in FIG. 10.

Shaft 144 is rotatably supported by a pair of brackets 166 mounted on member 36 by bolts 168. As seen in FIG. 3, brackets 166 include sleeve bearings 170 which provide free rotation of the shaft 144. Also secured to the shaft 144 are a pair of leaf spring actuator arms 172 and 174 which contact the adaptors 132 and 134, respectively, as illustrated in FIG. 11. Arms 172 and 174 are mounted on shaft 144 by support blocks 176 to which the arms are attached by bolts 178.

Prior to energization, the charge plate 44 is maintained in the position shown in FIG. 11 by the springs 142 which retract plate 44 into this remote position such that it abuts arms 172 and 174. Further outward movement of arms 172 and 174 is prevented by portion 180 of member 156 which contacts the top of member 36, thus preventing further rotation of shaft 144.

When the charge plate is to be translated into its normal operating position, the solenoid 146 is energized, rotating the shaft 44 and pressing the spring arms 172 and 174 against the charge plate adaptors 132 and 134 so as to overcome the relatively weak spring force provided by springs 142. The charge plate therefore moves inward into the position illustrated in FIG. 12 until the ends of slots 182 and 184 defined by adaptors 132 and 134, respectively, bottom out against pins 186, as shown in FIG. 12. Pins 186 are attached to the bottom of manifold portion 20 and extend downwardly therefrom. It should be noted that the end of slot 182 is generally U-shaped. As a consequence, the pin 186 extending into slot 182 acts not only as a limit to prevent further movement of the charge plate 44 toward the row of orifices, but also tends to align the charge plate 44 in a direction parallel to the row of orifices 24. The arms 172 and 174 are configured as leaf springs such that when the ends of slots 182 and 184 bottom out against 186, the arms 172 and 174 flex during further rotation of the shaft 144. This prevents damage to the charge plate actuation mechanism which might othewise occur.

Referring to FIGS. 13 and 14, the sequence of movement of the catcher and charge electrode plate at start up of the printer is as follows. Initially, the catcher 62 and the charge plate 44 are in their full catch and remote positions, respectively, shown in FIG. 14. It should be noted that the catcher plate 64 is pivoted such that it extends along the row of undeflected jet drop streams to either side thereof by a substantial distance. The operation of the print head 10 is initiated while maintaining the charge plate 44 in its remote position and while maintaining the catcher 62 in its full catch position. After the jet drop streams are stabilized, the charge plate 44 is translated into a position such that the charge electrodes partially surround associated fluid filaments at the points of break up, thus acting as a shield. Next, a deflection potential is supplied to deflection electrode 50, creating an electrical deflection field between electrode 50 and plate 54, which forms a part of the rotatable catcher assembly.

It will be appreciated that the deflection electrode 50 has impressed thereon an electrical potential which tends to produce a strong electrical field upstream at the point of drop formation. If the fluid filaments were left unshielded, this would produce charging of the drops in the jet drop streams to relatively high charge levels. As a result of mutual repulsion, the drops would be scattered, effectively spraying the printer structure and shorting out the high potential printer elements. By shifting the charge electrode plate 44 into its operating position before producing the deflection field, however, the charge electrodes shield the drops from the deflection field and thus preclude charging of the drops by the deflection field.

Next, charging of the drops is initiated, with a relatively large electrical charge being applied to the drops such that the drops are deflected by an amount sufficient to be caught, even after the catcher is pivoted into its operating position. Finally, the catcher 62 is pivoted into its operating position, shown in FIG. 13, in which the catcher plate 64 catches drops which are deflected by the greatest amount. The charge plate 44 and catcher 62 are now properly positioned for printing. Selective charging of drops in the jet drop streams by application of charge signals to be charge electrodes may be initiated, producing deflection of the drops to the various desired print positions.

At shut down of the printer, the sequence of steps is substantially the reverse of that utilized at start up. First, the selective charging of the drops in the jet drop streams is terminated, while maintaining the catcher 62 in its operating position and while maintaining the charge electrode plate 44 in its charging position, as illustrated in FIG. 13. All of the drops are charged to a relatively high level such that all of the drops are deflected to the catcher plate 64. The catcher is then pivoted into a full catch position. Next, the electrical deflection potential supplied previously to electrode 50 is removed from the electrode so as to eliminate the deflection field and charging of the drops is terminated. It is important that the charge electrode plate 44 be maintained in its charging position until this field is eliminated so that the jet drop streams continue to be shielded from the deflection field. The charge electrode plate 44 is then translated into its remote position, illustrated in FIG. 14. Finally, after the charge electrode plate 44 is moved to a position where it is remote from the jet drop streams, the print head 10 is shut down and whatever unstable jets temporarily result are caught by the catcher 62.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. In an ink jet printer, having a print head defining a plurality of orifices from which fluid filaments emerge to break up into jet drop streams, said jet drop streams being arranged in a row and directed toward a print receiving medium transport, a charge plate including a plurality of open sided charge electrodes for selectively charging drops in said jet drop streams, a deflection electrode positioned to one side of said row of jet drop streams between said print head and said print receiving medium transport, means for supplying an electrical deflection potential to said deflection electrode, and a catcher positioned between said print head and said print receiving medium transport, the method of initiating printer operation, comprising the steps of:

(a) initiating operation of said print head to produce a plurality of said jet drop streams, while maintaining said charge plate in a position remote from said jet drop streams, and while maintaining said catcher in a full catch position between said print head and said print receiving medium transport and extending a substantial distance to either side of said row of jet drop streams so as to catch the drops in said jet drop streams, (b) translating said charge plate toward said row of jet drop streams into a position such that said charge electrodes partially surround associated fluid filaments at the points of break up to provide shielding thereof, (c) applying said electrical deflection potential to said deflection electrode so as to produce a deflection field while utilizing said charge electrodes to shield said jet drop streams from said field, (d) pivoting said catcher into an operating position in which deflected drops strike said catcher while charging said drops sufficiently to deflect said drops to said catcher, and (e) initiating selective charging of said drops in said jet drop streams by selective application of charge potentials to said charge electrodes, whereby selected drops may be deflected to strike a print receiving medium carried by said print receiving medium transport.

2. In an ink jet printer, having a print head defining a plurality of orifices in which fluid filaments emerge to break up into jet drop streams, said jet drop streams being arranged in a row and directed toward a print receiving medium transport, a charge plate including a plurality of open sided charge electrodes for selectively charging drops in said jet drop streams, a deflection electrode positioned to one side of said row of said jet drop streams between said print head and said print receiving medium transport, means for supplying an electrical deflection potential to said deflection electrode, and a catcher positioned between said print head and said print receiving medium transport, the method of terminating printer operation, comprising the steps of:

(a) terminating selective charging of drops in said jet drop streams and charging all of said drops, while maintaining said catcher in an operating position in which all of said drops are deflected and strike said catcher, (b) pivoting said catcher into a full catch position between said print head and said print receiving medium transport such that said catcher extends a substantial distance to either side of said row of jet drop streams so as to catch the drops in said jet drop streams, (c) terminating the application of said electrical deflection potential to said deflection electrode so as to eliminate said deflection field while terminating charging of drops in said jet drop streams, (d) translating said charge plate away from said row of jet drop streams such that said charge electrodes are remote therefrom, and (e) terminating operation of said print head and production of said plurality of jet drop streams.

3. An ink jet printer for depositing ink drops on a print receiving medium carried by a print receiving medium transport, comprising:

print head means for generating a row of fluid filaments which break up into a row of jet drop streams directed at said medium transport, a plurality of charge electrodes mounted on a charge electrode plate, said plate being movable between a drop charging position, in which said charge electrodes are adjacent to and partially surround associated ones of said jet drop streams at the points of drop break up, and a remote position, means for selectively applying charging potentials to said charge electrodes, deflection electrode means for producing an electrical deflection field in the paths of said jet drop streams so as to deflect charged drops, a catcher means, including a catcher plate along the lower portion thereof, and being pivotally mounted for rotation about an axis parallel to said row of jet drop streams between an operating position in which said catcher plate is positioned to catch sufficiently deflected drops, while permitting jet drops which are deflected less by said field or are undeflected to strike said print receiving medium, and a full catch position in which said catcher plate is positioned in the path of undeflected jet drops and extends for a substantial distance on both sides of said row of jet drop streams, means for rotating said catcher means into said operating position and into said full catch position, and means for moving said charge plate from said remote position into said drop charging position prior to production of said electrical deflection field at start up of said printer, whereby said charge electrodes shield said jet drop streams so as to prevent charging of drops in said jet drop streams by said deflection electrode.

4. The ink jet printer of claim 3 in which said means for rotating said catcher means comprises a shaft attached to said catcher means and pivotally supported by catcher mounting means, said shaft defining a crank end portion, catcher linkage means engaging said crank end portion, catcher spring biasing means for urging said catcher means toward said full catch position, and catcher electrical actuator means, connected to said catcher linkage means, for rotating said catcher means into said operating position against the opposing force of said catcher spring biasing means.

5. The ink jet printer of claim 4 in which said catcher electrical actuator means comprises a solenoid actuator.

6. The ink jet printer of claim 3 in which said means for moving said charge plate comprises:

means for supporting said charge plate for sliding movement between said drop charging position and said remote position, charge plate spring biasing means for urging said charge plate toward said remote position, charge plate linkage means contacting said charge plate, and charge plate electrical actuator means, connected to said charge plate linkage, for moving said charge plate into said drop charging position against the opposing force of said charge plate spring biasing means.

7. The ink jet printer of claim 6 in which said charge plate electrical actuator means comprises a solenoid actuator.

8. The ink jet printer of claim 6 in which said charge plate linkage means includes cam means connected to said charge plate electrical actuator means for movement therewith, a pivotally mounted actuated shaft, cam follower plate means contacting said cam means and connected to said pivotally mounted actuation shaft, and charge plate actuator arms secured to said actuation shaft for rotation therewith and contacting said charge plate for moving said charge plate into said drop charging position against the opposing force of said charge plate spring biasing means.

9. The ink jet printer of claim 8 in which said charge plate actuator arms comprise leaf springs.

10. The ink jet printer of claim 3 in which said catcher means further comprises a plate, formed of a porous metal material, which cooperates with said deflection electrode means to produce said deflection field.

11. The ink jet printer of claim 10 in which said catcher means defines a vacuum cavity behind said plate and in which said catcher means further includes vacuum source means for applying a partial vacuum to said vacuum cavity so as to cause ink on said plate to be ingested into said cavity.

* * * * *